United States Patent
Kouame

(10) Patent No.: US 7,473,370 B2
(45) Date of Patent: Jan. 6, 2009

(54) WATER DISINFECTION METHOD USING SIMULTANEOUS MULTIPLE DISINFECTANTS

(76) Inventor: Yao B. Kouame, 1527 Loma Vista, Pasadena, CA (US) 91104

(*) Notice: Subject to any disclaimer, the term of this patent is extended or adjusted under 35 U.S.C. 154(b) by 0 days.

(21) Appl. No.: 11/960,459

(22) Filed: Dec. 19, 2007

(65) Prior Publication Data
US 2008/0093308 A1 Apr. 24, 2008

Related U.S. Application Data

(62) Division of application No. 11/012,798, filed on Dec. 15, 2004, now Pat. No. 7,332,076.

(51) Int. Cl.
*C02F 1/50* (2006.01)
*C02F 1/76* (2006.01)

(52) U.S. Cl. ............ 210/668; 210/694; 210/754; 210/764; 422/37

(58) Field of Classification Search .......... 210/754
See application file for complete search history.

(56) References Cited

U.S. PATENT DOCUMENTS 5,516,423 A * 5/1996 Conoby et al. ............ 210/85
6,315,950 B1 * 11/2001 Harp et al. ............ 422/28
6,398,965 B1 * 6/2002 Arba et al. ............ 210/652
6,716,354 B2 * 4/2004 Rosenblatt et al. ........ 210/638
6,881,583 B2 * 4/2005 Kahle ..................... 436/113
7,311,878 B2 * 12/2007 Singleton et al. .......... 422/37
2005/0211643 A1 * 9/2005 Phillips et al. ........... 210/753

FOREIGN PATENT DOCUMENTS

JP 10028981 * 2/1998

* cited by examiner

*Primary Examiner*—Peter A. Hruskoci
(74) *Attorney, Agent, or Firm*—Cardinal Law Group

(57) ABSTRACT

A water disinfection system using simultaneous multiple disinfectants includes a completely stirred tank reactor (CSTR) and a contact basin or clearwell acting as a plug flow reactor (PFR). The CSTR receives ammoniated water and free chlorine, and generates multiple disinfectants in primary disinfection water within the CSTR. The contact basin or clearwell receives primary disinfected water from the CSTR, the primary disinfected water containing the disinfectants. A method for water disinfection including mixing the non-disinfected treated water with ammonia to form ammoniated water, mixing the ammoniated water with free chlorine to form a primary disinfection water including multiple disinfectants, and maintaining the disinfectants in the primary disinfection water.

13 Claims, 5 Drawing Sheets

WATER DISINFECTION METHOD USING SIMULTANEOUS MULTIPLE DISINFECTANTS

CROSS REFERENCE TO RELATED APPLICATION

This is a division of U.S. patent application Ser. No. 11/012,798, filed Dec. 15, 2004, now U.S. Pat. No. 7,332,076, incorporated herein in its entirety by reference.

TECHNICAL FIELD

This invention relates generally to water treatment including drinking water and wastewater treatment and, particularly, to a water disinfection system using simultaneous multiple disinfectants (SMDs).

BACKGROUND OF THE INVENTION

Several resistant microorganisms forming protective cysts, such as *Giardia* and *Cryptosporidium*, have been found in drinking water systems in recent years and have demonstrated resistance to conventional chlorine disinfection. The conventional disinfection process involves free chlorine (HOCl/OCl$^-$) as a single disinfectant or monochloramine (NH$_2$Cl) as a single disinfectant to inactivate microorganisms during drinking water and wastewater treatment.

To solve the problem of microorganisms resistant to conventional chlorine disinfection, the drinking water industry has looked for alternative disinfectants, such as ozone (O$_3$) and chlorine dioxide (ClO$_2$). These alternative disinfectants are believed to be more effective in the process of inactivating microorganisms that are resistant to free chlorine (HOCl/OCl$^-$) or monochloramine (NH$_2$Cl) disinfection. However, ozone and chlorine dioxide produce disinfection byproducts that may be considered detrimental to human health.

Ozone produces brominated organic disinfection byproducts and bromate (BrO$_3^-$) when the source water contains bromide (Br$^-$). Ozone also oxidizes chloride (Cl$^-$) present in the raw water to produce chlorinated organic byproducts. In addition, ozone disinfection is an energy intensive process and requires sophisticated operational skills. Ozone is not suitable as an alternative disinfectant for small water treatment systems, which represent about 87% of community water systems in the United States.

Chlorine dioxide (ClO$_2$) disinfection produces byproducts such as chlorite (ClO$_2^-$), chlorate (ClO$_3^-$), and organic byproducts. If the water disinfected by chlorine dioxide is stored in uncovered storage basins, sunlight increases the chlorate concentration.

The present dilemma facing the drinking water industry is to find a disinfection strategy that will strike the balance between the effectiveness of inactivating pathogen organisms and the minimization of byproducts formed during water disinfection. In this regard, neither of the alternative chemicals to chlorine disinfection nor free chlorine and monochloramine as presently used in the drinking water industry can deliver on the above dilemma.

New regulations require finished water to be free from pathogens and contain the minimum possible of disinfection byproducts, so the water industry is turning to the use of multiple disinfectants. However, the trend in the practice of multiple disinfectants presently established is the sequential use of a primary disinfectant that essentially does the actual inactivation work, followed by a secondary disinfectant that provides a residual disinfectant in the distribution system and may minimize the byproduct formation. Even with the sequential use of disinfectants involving ozone, free chlorine, monochloramine, and chlorine dioxide, the problem of byproduct formation is not solved.

Traditionally, monochloramine (NH$_2$Cl) and dichloramine (NHCl$_2$), which are commonly called chloramines or combined chlorine, are considered weak disinfectants and weak oxidants compared to free chlorine. This makes free chlorine the only effective disinfectant. Accordingly, chloramines are considered byproducts that need to be destroyed to guaranty an effective disinfection. This consideration is embedded in a well-known disinfection practice called breakpoint chlorination that aims at complete oxidation of ammonia to prevent the interference of chloramines in the disinfection process. The problem with breakpoint chlorination is the quantity of chlorine used to achieve either partial or total destruction of ammonia: it takes a minimum of 7.6 g (grams) of chlorine to destroy 1 g of ammonia dissolved in the raw water under treatment. The chlorine reaction is not restricted to ammonia only during the process, so there is enough chlorine to react at the same time with dissolved organic matter to form undesirable byproducts.

Disinfection systems typically use a plug flow type of reactor configuration alone. Chlorine is bled into the system and allowed to drift downstream. During this process, chlorine is mixed slowly with the total mass of water to be disinfected. This favors byproduct formation because there is enough time for extensive chlorine reactions to occur with dissolved organic substances.

Conventional disinfection practices also apply to wastewater effluent disinfection. This requires a high dose of chlorine to reach the effluent discharge standard for *E. coli*, so an excessive amount of chlorinated organic byproducts are formed during the process. Given the high density of suspended solids and the potential of high chlorine demand in the wastewater effluent, chlorine is ineffective in inactivating microorganisms forming protective cysts that may be found in wastewater.

To solve the problem of chlorinated organic compound formation, the wastewater industry has turned to ultra violet (UV) light disinfection as an alternative to chlorine. However, the inactivation capability of UV disinfection against microorganisms forming protective cysts, such as *Giardia* and *Cryptosporidium*, is very limited. Under some circumstances, the photobiochemical damage to organisms caused by UV irradiation can be repaired through photoreactivation or dark repair. This allows microorganisms inactivated by UV to regain their viability following the disinfection process. Additional problems that may impair the effectiveness of UV disinfection include limits on effective lamp output and the presence of suspended solids in wastewater. Therefore, conventional chlorine and UV disinfection are inadequate to effectively inactivate microorganisms including protozoan cysts in wastewater effluent.

Accordingly, it would be desirable to have a water disinfection system using simultaneous multiple disinfectants that overcomes the disadvantages above described.

SUMMARY OF THE INVENTION

The water disinfection system using simultaneous multiple disinfectants of the present invention provides water disinfection through the simultaneous application of residual free chlorine, monochloramine, and dichloramine as disinfectants.

One aspect of the present invention provides a system for water disinfection including a completely stirred tank reactor (CSTR) receiving ammoniated water and free chlorine to form primary disinfection water, the CSTR generating multiple disinfectants in the primary disinfection water; and a contact basin or clearwell receiving primary disinfected water from the CSTR, the primary disinfected water containing the disinfectants.

Another aspect of the present invention provides a method for water disinfection including mixing non-disinfected treated water with ammonia to form ammoniated water; mixing the ammoniated water with free chlorine to form primary disinfection water including disinfectants; and maintaining the disinfectants in the primary disinfection water.

Another aspect of the present invention provides a system for disinfection of water including means for mixing non-disinfected treated water with ammonia to form ammoniated water; means for mixing the ammoniated water with free chlorine to form primary disinfection water including disinfectants; and means for maintaining the disinfectants in the primary disinfection water.

Another aspect of the present invention provides a system for water disinfection including a tank; a water inlet connected to the tank and providing ammoniated water; a chlorine inlet connected to the tank and providing free chlorine; wherein the ammoniated water and the free chlorine mix to form primary disinfection water including disinfectants.

The invention provides the foregoing and other features, and the advantages of the present invention will become further apparent from the following detailed description of the presently preferred embodiments, read in conjunction with the accompanying drawings. The detailed description and drawings are merely illustrative of the invention and do not limit the scope of the invention, which is defined by the appended claims and equivalents thereof.

DETAILED DESCRIPTION OF PRESENTLY PREFERRED EMBODIMENTS

Figure 1:
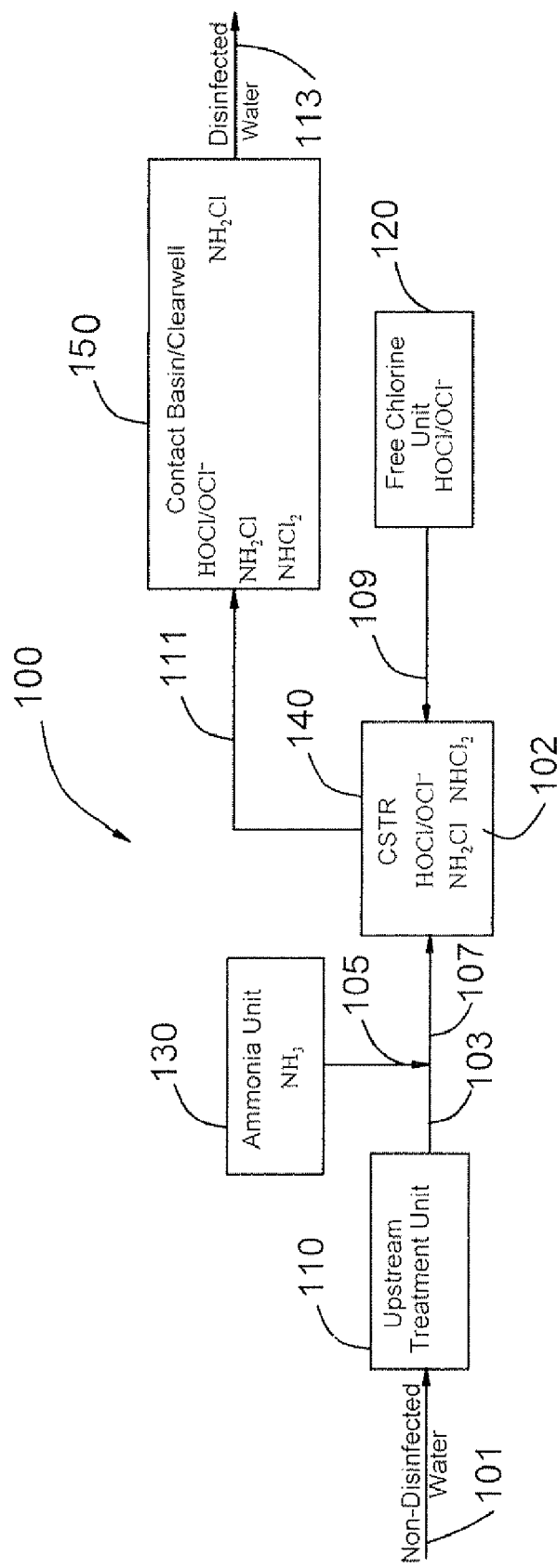
FIG. 1 is a block diagram of a simultaneous multiple disinfectant (SMD) system made in accordance to the present invention.

FIG. 1 is a block diagram of a simultaneous multiple disinfectant (SMD) system. The SMD system 100 includes an upstream treatment unit 110 receiving non-disinfected water 101. The non-disinfected water 101 may be a drinking water that has undergone any other necessary treatment before the disinfection process. For drinking water, the upstream treatment unit 110 is a filtration unit. The non-disinfected water 101 may also be a treated wastewater effluent that is ready for disinfection. For treated wastewater effluent, the upstream treatment unit 110 can be a secondary clarifier, a secondary clarifier followed by tertiary treatment units such as a multimedia filtration unit, carbon adsorption unit or the combination of other tertiary wastewater polishing units used to increase the quality of the wastewater effluent.

The non-disinfected treated water 103 coming out of the upstream treatment unit 110 is mixed with ammonia 105 from the ammonia unit 130 to form the ammoniated water 107 still containing microorganisms to be disinfected from the non-disinfected water 101. The ammoniated water 107 is provided to the completely stirred tank reactor (CSTR) 140 and mixed with free chlorine 109 from the free chlorine unit 120 to form the primary disinfection water 102 including the multiple disinfectants. The multiple disinfectants coexist in the primary disinfection water 102 within the CSTR 140 to ensure that an effective primary disinfection process takes place. After the primary disinfection in the CSTR 140, the primary disinfected water 111 containing the multiple disinfectants leaves the CSTR 140 and flows to the contact basin 150. Typically, the contact basin 150, which is a chlorine contact basin or clearwell, provides a plug flow type of reactor (PFR) such that the disinfectants passing through the contact basin 150 continue to interact. The contact basin 150 provides additional chlorine residual contact time with microorganisms during a secondary disinfection process, and creates an environment to promote the disproportionation of dichloramine formed in the CSTR 140. The chlorine residual at the end of the contact basin 150 is predominantly monochloramine as the final disinfected water 113 passes into the distribution system or a receiving water body.

In one embodiment, the ammonia unit 130 is optional and is provided as a standby unit. When the non-disinfected water 101 contains a high concentration of ammonia, such as in the case of a non-nitrified wastewater effluent, no ammonia needs to be added to the non-disinfected treated water 103. The non-disinfected treated water 103 is already ammoniated water and suitable for processing in the CSTR 140.

Figure 2:
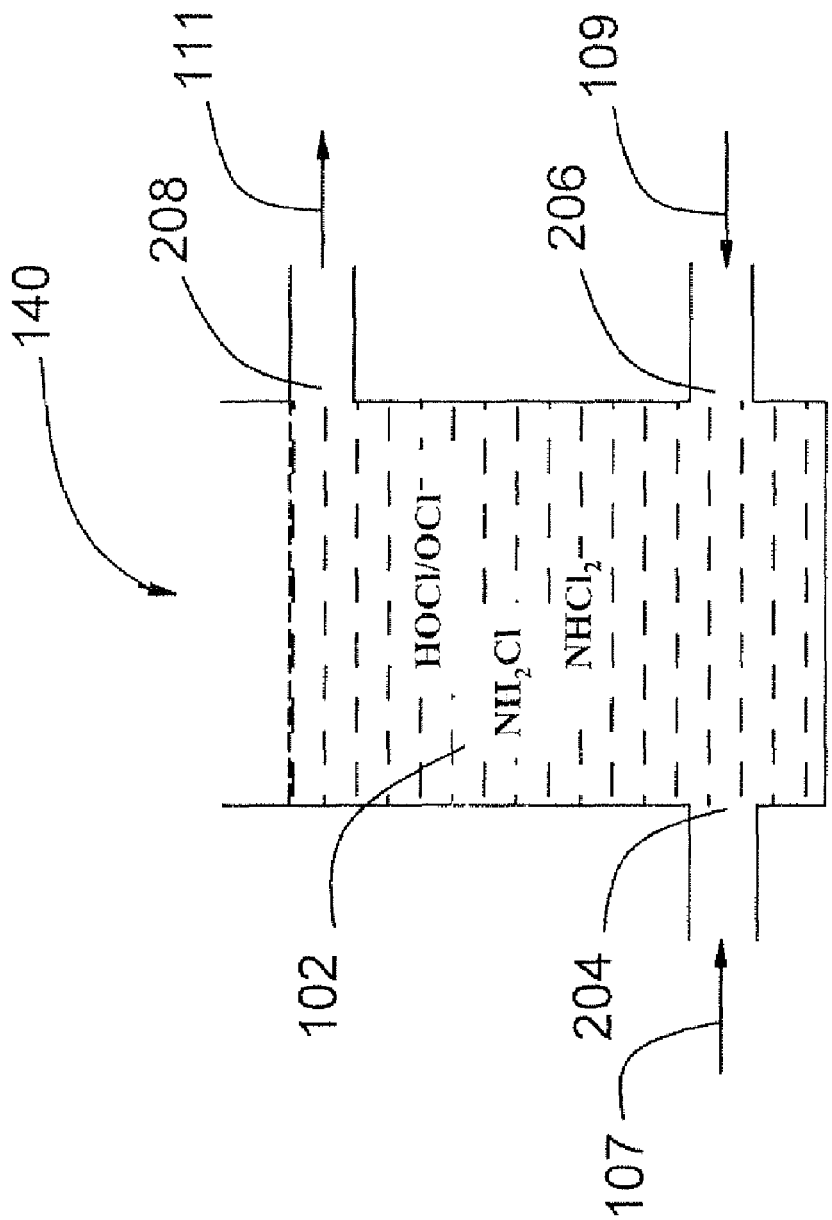
FIGS. 2 & 3 are schematic diagrams of compound flow and components, respectively, of a completely stirred tank reactor (CSTR) for a simultaneous multiple disinfectant (SMD) system made in accordance to the present invention.
Figure 3:
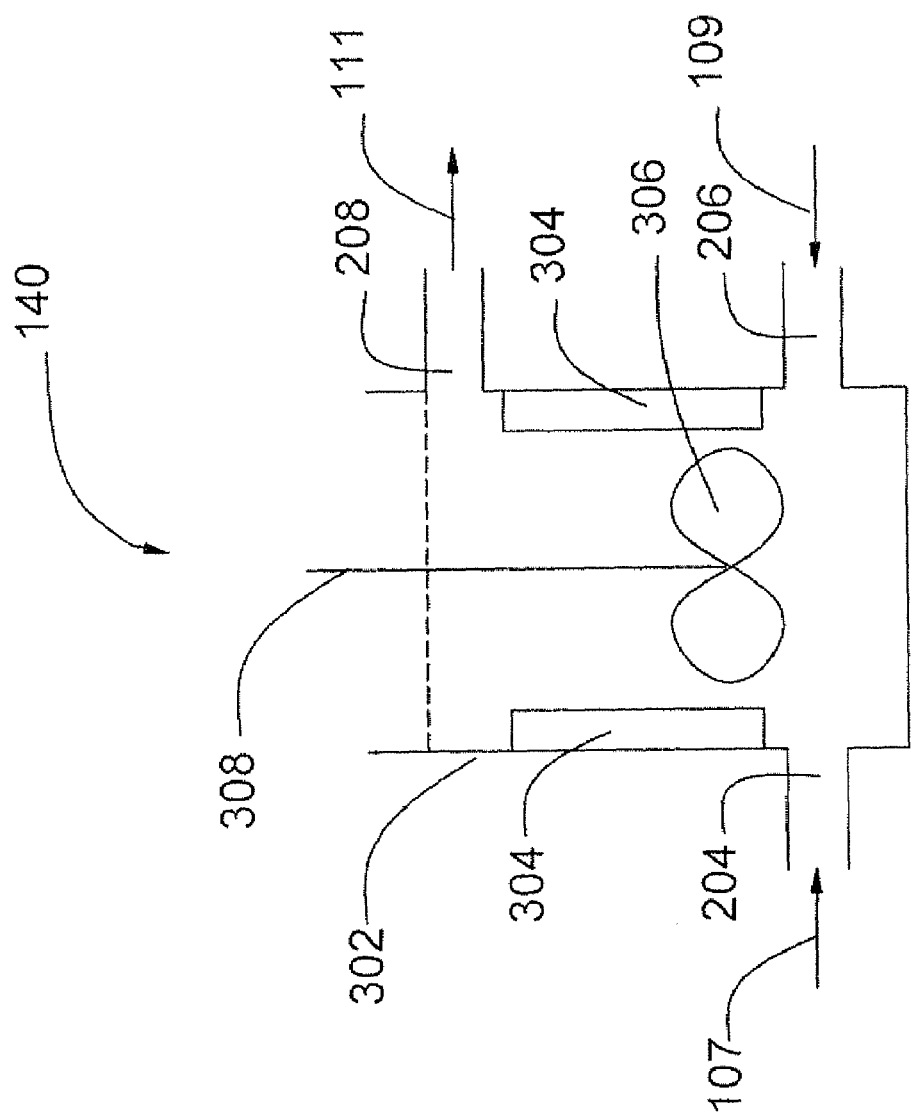

FIGS. 2 & 3, in which like elements share like reference numbers with each other and with FIG. 1, are schematic diagrams of compound flow and components, respectively, of a completely stirred tank reactor (CSTR) for a simultaneous multiple disinfectant (SMD) system.

FIG. 2 is a schematic diagram showing the external configuration of CSTR 140 used in the SMD process for disinfection such as drinking water or wastewater disinfection. FIG. 2 also presents the formation of chlorine compounds used as primary disinfectants (residual free chlorine, monochloramine, and dichloramine) within CSTR 140. The chlorine disinfectants coexist in the primary disinfection water 102, and are identified by their respective chemical formulas: $HOCl/OCl^-$, $NH_2Cl$, and $NHCl_2$.

The typical CSTR used for the SMD process is a tank with two inlets and an outlet that are all connected to the tank. The first inlet and the second inlet supply, respectively, a first solution and a second solution to the tank. The first solution and the second solution thoroughly mix upon their introduction into the tank to produce simultaneous multiple disinfectants that coexist within the tank. The multiple disinfectants produced exit the tank through the outlet and are received by a contact basin or clearwell.

For the exemplary case of the CSTR 140 as illustrated, the first inlet is a water inlet 204, and the second inlet is a free chlorine inlet 206. Water inlet 204 receives the ammoniated water 107 containing microorganisms to be disinfected. Chlorine inlet 206 carries in free chlorine 109 from the chlorine unit 120. Upon the mixing of the above ammoniated water 107 and free chlorine 109 in the CSTR 140, the free chlorine 109 reacts with the ammonia in the ammoniated water 107 to produce monochloramine and dichloramine. The monochloramine and dichloramine coexist in the CSTR 140 with part of the free chlorine 109 introduced in the CSTR 140. Microorganisms in the ammoniated water 107 are simultaneously exposed to the three disinfectants (free chlorine, monochloramine, and dichloramine) formed in the CSTR 140 for a powerful primary disinfection process. At the end of the primary disinfection period in CSTR 140, the primary disinfected water 111 leaves the CSTR 140 through outlet 208 to the contact basin 150.

FIG. 3 shows the internal components of a typical CSTR 140 used in the SMD process. The CSTR 140 includes a tank 302, a water inlet 204 connected to the tank 302 providing ammoniated water 107, a chlorine inlet 206 connected to the tank 302 providing free chlorine 109. The ammoniated water 107 and the free chlorine 109 mix to form primary disinfection water including the disinfectants. A stirring rod 308 rotates an impeller 306 to thoroughly mix the water content of the CSTR 140. Baffles 304 on the inside of the CSTR 140 improve mixing and prevent short-circuiting within the CSTR 140. The CSTR 140 ensures a complete mixing of the ammoniated water 107 and the free chlorine 109 to produce the simultaneous multiple disinfectants consisting of free chlorine, monochloramine, and dichloramine.

The method for the disinfection of water with simultaneous multiple disinfectants (SMDs) includes mixing the non-disinfected treated water with ammonia to form ammoniated water, mixing the ammoniated water with free chlorine to form a primary disinfection water including the multiple disinfectants, and maintaining the disinfectants in the primary disinfection water within the CSTR. The disinfectants are typically residual free chlorine, monochloramine, and dichloramine that together constitute the primary disinfectants.

The strategy of the SMD process is to maximize the inactivation power of the disinfection process in the CSTR with the simultaneous presence of dichloramine along with free chlorine and monochloramine, and eliminate dichloramine through its natural disproportionation after the CSTR operation. The presence of dichloramine in the CSTR even at a smaller concentration compared to free chlorine and monochloramine boosts the inactivation of microorganisms. The elimination of dichloramine through disproportionation is a slower process that will not affect its stability within the CSTR where it is needed the most. Therefore, within the CSTR where the maximum inactivation occurs, the concentrations of all the disinfectants involved in the process are stable at any resident time, as they react simultaneously against microorganisms. With the choice of the operating pH, dichloramine will disproportionate within the contact basin or clearwell because of a higher residence time in the basin. Only monochloramine remains as the final chlorine residual in the water distribution system or receiving water body.

Mixing ammoniated water with free chlorine to form primary disinfection water including multiple disinfectants combines the disinfection power of free chlorine (HOCl/OCl$^-$), monochloramine (NH$_2$Cl), and dichloramine (NHCl$_2$) for a more effective inactivation of microorganisms. The disinfection power in this case is greatly enhanced by the presence of dichloramine. On a mole to mole basis, one mole of HOCl, OCl$^-$ or NH$_2$Cl is equivalent to one mole of chlorine molecule Cl$_2$. However, one mole of NHCl$_2$ is equivalent to two moles of Cl$_2$. Consequently, one mole of NHCl$_2$ has twice the disinfectant power of Cl$_2$, and on a mass to mass basis, NHCl$_2$ has 165 percent the oxidation power of chlorine molecule Cl$_2$. The combined power of the three disinfectants involved in the SMD process as primary disinfectants produces the highest synergistic interaction of chlorine compounds during the disinfection process. Therefore, the above combined power of the three primary disinfectants brings about 95 to 99% of the microbial inactivation in the CSTR.

The mixing of ammoniated water with free chlorine in a CSTR hastens the already rapid reaction between chlorine and ammonia. This reduces the free chlorine available for the slower byproduct generation due to free chlorine reaction with dissolved organic matter (DOM). Hence, the byproduct formation is minimized during the SMD process.

Mixing the ammoniated water with free chlorine to form primary disinfection water including multiple disinfectants makes use of the dependency of free chlorine and chloramines on the operating pH. For example, free chlorine exists as hypochlorous acid (HOCl) in the approximate range of pH 2 to pH 6, and as a mixture of hypochlorous acid (HOCl) and hypochlorite ion (OCl$^-$) in the approximate range of pH 6 to pH 9.5. For chloramines, dichloramine exists in the approximate range of pH 4 to pH 5, a mixture of dichloramine and monochloramine exists in the approximate range of pH 5 to pH 8.5, and only monochloramine exists at or above pH 9. In moving from pH 5 to pH 8.5, the stability of dichloramine decreases while the stability of monochloramine increases.

The pH also influences the dynamics of dichloramine formation in the CSTR and allows the maximum concentration of monochloramine to be reached before the coexistence of residual free chlorine, monochloramine, and dichloramine occurs. Between about pH 5 and pH 6, the formation of dichloramine starts before the maximum concentration of monochloramine is reached, so a higher concentration of dichloramine is possible. Between about pH 6 and pH 7, at the maximum concentration of monochloramine, dichloramine is also formed but at a lower concentration. Between about pH 7 and pH 8, dichloramine appears after the maximum monochloramine concentration is reached, so the concentration of dichloramine is much smaller. The pH in the CSTR is in the approximate range of pH 5 to pH 8.5, and is typically in the approximate range of pH 7.5 to pH 8.0 for drinking water disinfection and is typically in the approximate range of pH 7.0 to pH 8.0 for wastewater disinfection. Given the density of microorganisms in the wastewater effluent, a higher dichloramine concentration can be used for wastewater disinfection to provide greater disinfection against microorganisms including those with protective cysts. In contrast, a smaller concentration of dichloramine may be used during drinking water disinfection for a superior inactivation of microorganisms as well as protozoa with protective cysts. Those skilled in the art will appreciate that the pH can be selected to provide the particular result desired.

The amount of unreacted ammonia can be reduced by the choice of chlorine to ammonia weight ratio. The weight ratio of chlorine to ammonia can be in the approximate range of 3:1 to 10:1 depending on the particular application of the SMD process. For drinking water disinfection, the weight ratio of chlorine to ammonia is typically in the approximate range of 3:1 to 5:1, and more particularly in the approximate range of 3.5:1 to 4.5:1. This range allows the maximum concentration of monochloramine to form in the CSTR. Any incremental increase in the free chlorine concentration after the maximum concentration of monochloramine is reached appears as free chlorine and dichloramine that coexist with the monochloramine already formed at its maximum concentration. For wastewater disinfection, the weight ratio of chlorine to ammonia is typically in the approximate range of 5:1 to 10:1, and more particularly in the approximate range of 5:1 to 7:1. In one wastewater disinfection example, an operating pH of about 7 and a chlorine to ammonia weight ratio of about 6:1 provides the formation of a substantial concentration of dichloramine before the maximum concentration of monochloramine is reached in the CSTR.

For nitrified wastewater, the ammonia in the wastewater is oxidized to nitrate ($NO_3^-$) and the wastewater may contain nitrite ($NO_2^-$) at the same time. The nitrite competes with the reaction that produces the multiple disinfectants. Therefore, more free chlorine is required if nitrite is present in the non-disinfected wastewater effluent.

The disinfectants in the CSTR (residual free chlorine, monochloramine, and dichloramine) interact when they flow in the contact basin or clearwell. Given that the process scheme in the CSTR is to allow monochloramine to reach its maximum concentration, monochloramine remains the main chlorine residual in the disinfected water. Especially for drinking water disinfection, because of the small concentration of dichloramine needed, the selection of the operating pH, in addition to the higher residence time in the clearwell, dichloramine disproportionates before the treated water reaches the distribution system. Monochloramine is commonly used as a secondary disinfectant, and conventionally, as an alternative to free chlorine for the control of byproduct formation. The SMD process maximizes the inactivation of microorganisms with the simultaneous presence of the three primary disinfectants in the CSTR while it minimizes byproduct formation with the presence of monochloramine as the final chlorine residual during water disinfection.

Figure 4:
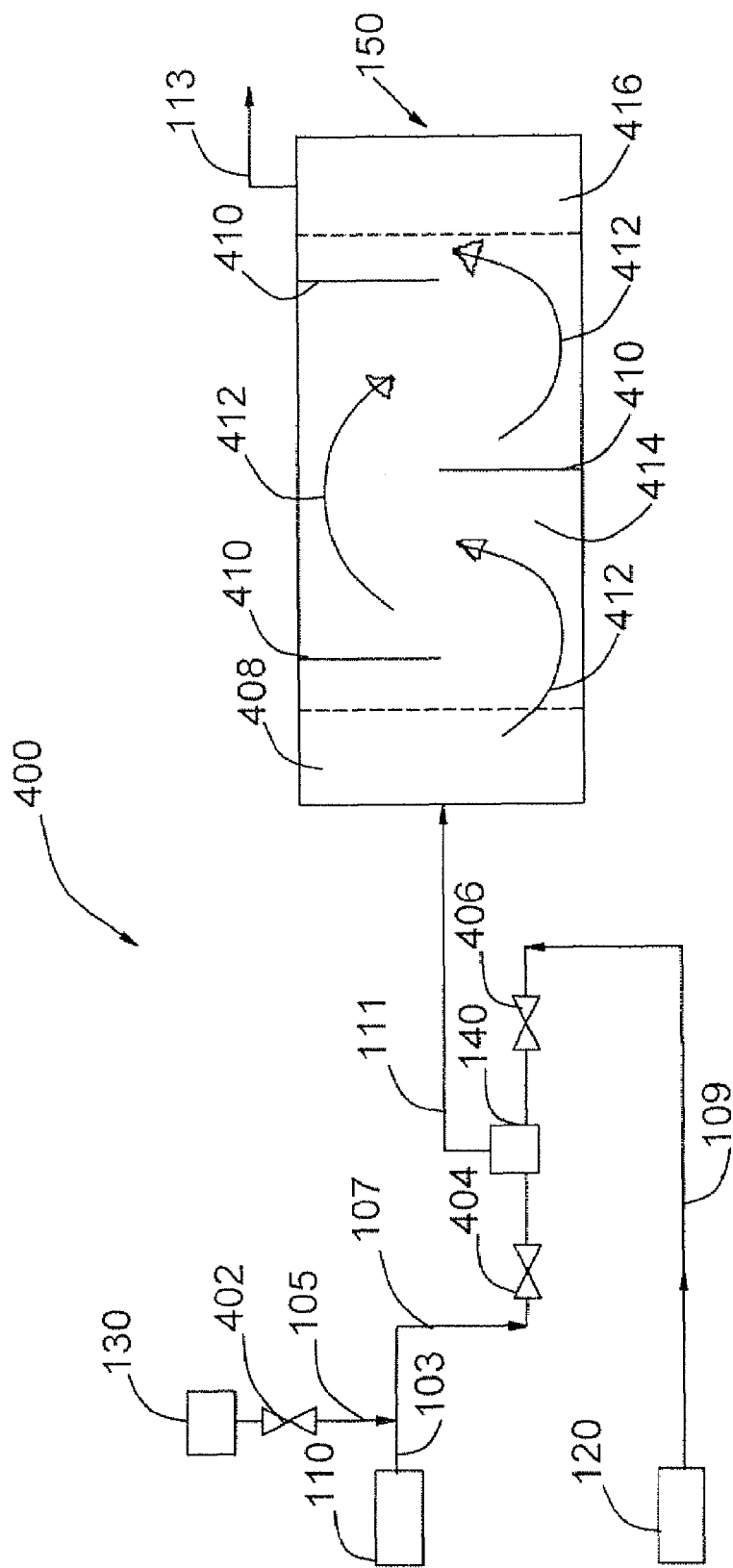
FIG. 4 is a schematic diagram of a simultaneous multiple disinfectant (SMD) system for water disinfection made in accordance to the present invention.

FIG. 4, in which like elements share like reference numbers with FIG. 1, is a schematic diagram of a simultaneous multiple disinfectant (SMD) system 400 for drinking water or wastewater treatment. Non-disinfected treated water 103 from the upstream treatment unit 110 is mixed with ammonia 105 from the ammonia unit 130 that flows through valve 402, and the resulting ammoniated water 107 is fed to the CSTR 140 through valve 404. Free chlorine 109 from the free chlorine unit 120 flows to the CSTR 140 through valve 406. The ammoniated water 107 and free chlorine 109 are well mixed in the CSTR 140 to produce the disinfectants residual free chlorine, monochloramine, and dichloramine that coexist in CSTR 140. The relative proportion in which the multiple disinfectants are formed in the primary disinfection water within the CSTR 140 depends on the operating pH and the chlorine to ammonia mass ratio. In CSTR 140, the disinfectants react simultaneously with microorganisms that are in the ammoniated water 107 during a primary disinfection process. When the primary disinfection in the CSTR 140 is completed, the primary disinfected water 111 containing the multiple disinfectants and the rest of non-inactivated microorganisms leave the CSTR 140, and flow to the contact basin 150. Additional exposure of the microorganisms to the disinfectants occurs in the contact basin 150 for a secondary disinfection before the final disinfected water 113 is sent to the distribution system.

In another embodiment, the final disinfected water 113 leaves the chlorine contact basin 150 to a receiving water body as in the case of the discharge of a disinfected wastewater effluent.

The contact basin 150 acts as a plug flow reactor (PFR) due to the presence of baffles 410. The contact basin 150 includes an entrance region 408, an exit region 416, and a transitional region 414. In the entrance region 408, the three primary disinfectants (residual free chlorine, monochloramine, and dichloramine) are present. As the primary disinfected water 111 flows from the entrance region 408 to the exit region 416, the change in the flow patterns 412 and the longitudinal concentration gradient in the contact basin 150 allow continued interaction between the multiple disinfectants. This interaction occurs primarily within the transitional region 414. Most of the dichloramine disproportionates during the above transition because of the operating pH and the longer contact time in the contact basin 150.

When the primary disinfected water reaches the exit region 416, it is ready to be sent to storage tanks, directly to the distribution system, or to a receiving water body as the final disinfected water 113. The residual chlorine compounds in the final disinfected water 113 are typically about 99% monochloramine with trace amounts of free chlorine and dichloramine. The monochloramine constitutes a secondary disinfectant, which ensures the biological quality of the disinfected water in the distribution system and helps to minimize extensive byproduct formation.

Figure 5:
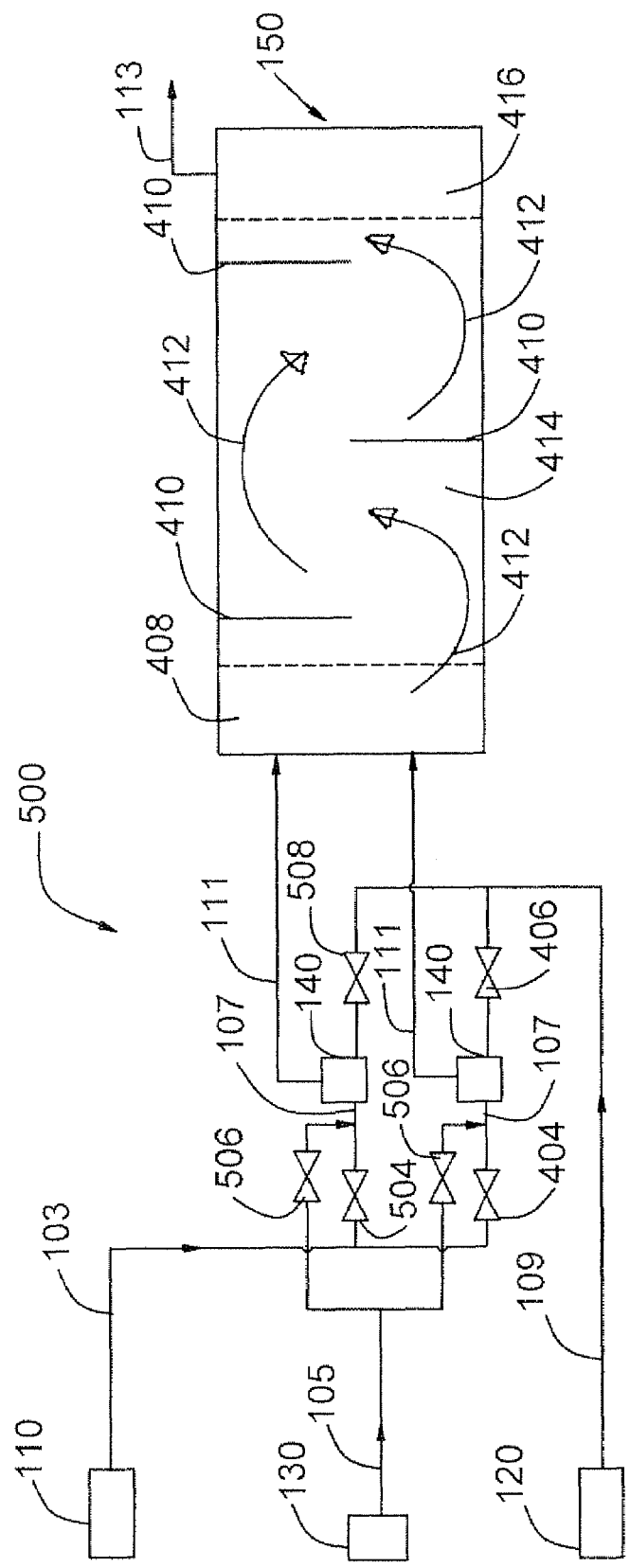
FIG. 5 is a schematic diagram of another embodiment of a simultaneous multiple disinfectant (SMD) system for water disinfection made in accordance to the present invention. The flow from one unit to another is indicated by means of arrows.

FIG. 5, in which like elements share like reference numbers with FIG. 1 and FIG. 4, is a schematic diagram of another embodiment of a simultaneous multiple disinfectant (SMD) system for drinking water and wastewater disinfection. Multiple completely stirred tank reactors (CSTRs) are used. Those skilled in the art will appreciate that the number and size of the CSTRs can be varied to suit the particular volume of water treated.

Ammonia 105 from the ammonia unit 130 is distributed through valves 506 to the CSTRs 140. The non-disinfected treated water 103 from the upstream treatment unit 110 flows through valves 404 and 504 and mixes with the ammonia 105 to form ammoniated water 107 before flowing into the CSTRs 140. Free chlorine 109 enters the CSTRs 140 through valves 406 and 508. The mixing of the ammoniated water 107 and free chlorine 109 in the CSTRs 140 brings about the formation of the multiple disinfectants. The microorganisms present in the ammoniated water 107 are simultaneously exposed to the primary disinfectants free chlorine, monochloramine, and dichloramine that coexist upon formation in the primary disinfection water within the CSTRs 140.

At the end of the primary disinfection process in the CSTRs 140, the primary disinfected water 111 from the CSTRs 140 is sent to the contact basin or clearwell 150. The primary disinfected water undergoes plug flow in the contact basin 150 and the final disinfected water 113 flows to the distribution system, storage tanks or receiving water body.

In another embodiment, the primary disinfected water from each of the multiple CSTRs 140 may be combined before flowing into the contact basin or clearwell.

Although the invention has been illustrated and described in terms of the preferred embodiments to facilitate better understanding and applications thereof, the above embodiments are not intended to restrict the invention in any of the ways it can be used. It is anticipated that alterations and modifications may be apparent to those skilled in the art. Therefore, the interpretation of the claims as set forth in this invention is to cover all forms of modifications that fall within the principle and scope embodied in this invention. While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

I claim:

1. A method for water disinfection comprising:
   mixing non-disinfected treated water with ammonia to form ammoniated water;
   mixing the ammoniated water with free chlorine in a completely stirred tank reactor CSTR to form primary disinfection water including simultaneous multiple disinfectants, the CSTR generating the simultaneous multiple disinfectants in the primary disinfection water; and maintaining the simultaneous multiple disinfectants in the primary disinfection water;

wherein the simultaneous multiple disinfectants are residual free chlorine, monochloramine, and dichloramine, which coexist in the primary disinfection water within the CSTR.

2. The method of claim 1 further comprising pretreating non-disinfected water to produce the non-disinfected treated water.

3. The method of claim 2 wherein the pretreating non-disinfected water comprises pretreating the non-disinfected water by a method selected from the group consisting of filtration, secondary clarification, carbon adsorption, tertiary wastewater effluent polishing, and combinations thereof.

4. The method of claim 1 wherein the mixing the ammoniated water with free chlorine to form primary disinfection water including simultaneous multiple disinfectants comprises mixing the ammoniated water with free chlorine to form stable concentrations of the simultaneous multiple disinfectants.

5. The method of claim 1 further comprising routing the primary disinfection water as primary disinfected water, and maintaining the simultaneous multiple disinfectants in the primary disinfected water.

6. The method of claim 5 wherein the maintaining the simultaneous multiple disinfectants in the primary disinfected water comprises maintaining the simultaneous multiple disinfectants in the primary disinfected water in a contact basin.

7. The method of claim 6 wherein the contact basin creates plug flow of the primary disinfected water.

8. The method of claim 5 wherein the maintaining the simultaneous multiple disinfectants in the primary disinfected water comprises maintaining the simultaneous multiple disinfectants in the primary disinfected water until monochloramine with trace amounts of free chlorine and dichloramine remain.

9. The method of claim 1 further comprising maintaining pH of the primary disinfection water in the range of 5.0 to 8.5.

10. The method of claim 1 further comprising maintaining pH of the primary disinfection water in the range of 7 to 8.

11. The method of claim 1 further comprising maintaining chlorine to ammonia mass ratio of the primary disinfection water in the range of 3:1 to 10:1.

12. The method of claim 1 further comprising maintaining chlorine to ammonia mass ratio of the primary disinfection water in the range of 3.5:1 to 4.5:1.

13. The method of claim 1 further comprising maintaining chlorine to ammonia mass ratio of the primary disinfection water in the range of 5:1 to 7:1.

* * * * *